United States Patent

Hanslik

[15] 3,640,669
[45] Feb. 8, 1972

[54] MULTIPLE-SCREW EXTRUDER

[72] Inventor: Wilhelm Hanslik, Vienna, Austria
[73] Assignee: Dorplastex A.G., Zug, Switzerland
[22] Filed: Nov. 5, 1969
[21] Appl. No.: 874,236

[30] Foreign Application Priority Data

Nov. 18, 1968  Austria ............................. A 11202/68

[52] U.S. Cl. ........................................................... 425/376
[51] Int. Cl. ............................................................. B29f 3/02
[58] Field of Search .............. 18/12 SP, 12 SM, 12 SE, 30 SM

[56] References Cited

UNITED STATES PATENTS

| 2,550,226 | 4/1951 | Colombo | 18/12 |
| 2,581,451 | 1/1952 | Sennet | 18/12 SP UX |
| 2,802,238 | 8/1957 | Colombo | 18/12 SP |
| 3,043,480 | 7/1962 | Wittrock | 18/12 SP UX |
| 3,248,469 | 4/1966 | Kosinsky et al. | 18/12 SM X |
| 3,310,837 | 3/1967 | Wittrock | 18/12 SP |
| 3,325,864 | 6/1967 | Kohyama et al. | 18/12 SP |

Primary Examiner—J. Spencer Overholser
Assistant Examiner—Michael O. Sutton
Attorney—Koenig, Sanniger, Powers & Leavitt

[57] ABSTRACT

A multiple-screw extruder which has a central feed screw meshing with two or more outer screws uniformly spaced around the circumference of the central screw, its outer screws having a mean thread diameter equal to a mean thread diameter of the central screw divided by the number of outer screws.

10 Claims, 3 Drawing Figures

PATENTED FEB 8 1972
3,640,669
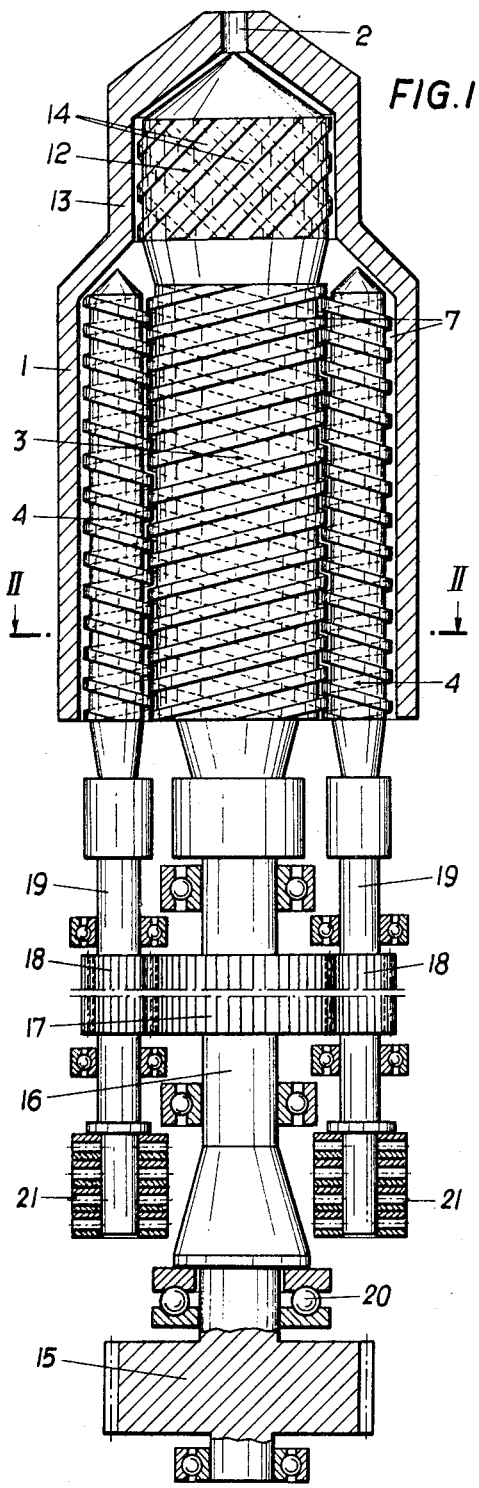
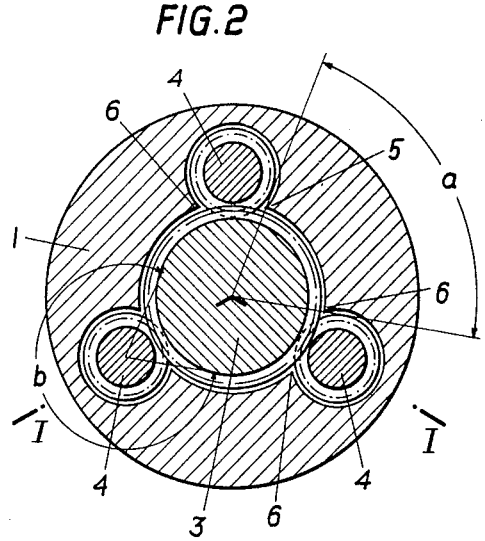
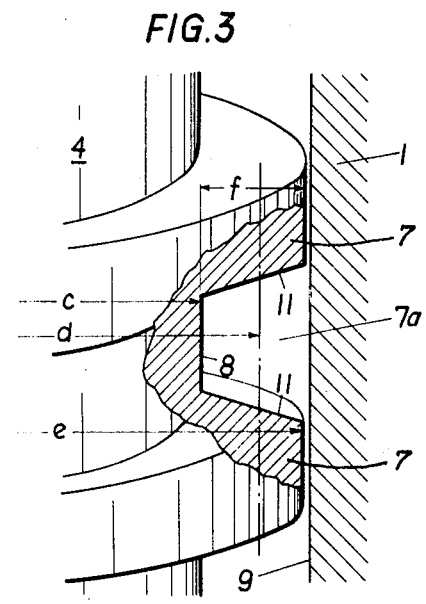
INVENTOR:
Wilhelm Hanslik,
BY  *Ernest P. Marunak*,
HIS ATTORNEY.

MULTIPLE-SCREW EXTRUDER

BACKGROUND OF THE INVENTION

This invention relates to a multiple-screw extruder for thermoplastic materials or the like.

Extruders having two meshing feed screws driven in opposite directions are known. The dimensions of the threads of the meshing feed screws are limited by the condition that the cross section of the thread must not become excessive as this would interfere with the even heating of the material being extruded and with its homogenization. The feed rate of these twin screw extruders is limited, when used with heat-sensitive plastics, for example, to a maximum flow of about 300 kg. per hour in the processing of pure polyvinyl chloride. If heavy sections are to be produced having a considerable weight per unit length, this performance is no longer adequate for efficient working. If the section to be produced is to have a weight of 80 kg. per meter, a rate of only a few centimeters per minute is obtained, so that the installation with its comparatively high initial costs no longer operates economically. There is also the difficulty that extruders for large outlet cross sections take up considerable space so that the plastic material is likely to dwell for a fairly long time in the extruder, on account of the comparatively low rate of feed. There is accordingly a danger that the material may decompose in the extruder. It has therefore already been proposed to use several such twin screw extruders in parallel. However, quite apart from the costs of an installation of this kind, the combining of the extruded materials presents difficulties and there is also a danger that the extruded material is no longer of homogeneous structure. These arrangements with several twin feed screw extruders can accordingly be used only for processing insensitive materials, such as polyvinyl chloride mixed with a filler.

It has also been suggested to provide an extruder with more than two feed screws meshing with each other in the sense that several feed screws mesh with a common central screw. However, these known arrangements have the disadvantage that the rate of feed of the central screw differs from that of the outer screws so that these arrangements have not been successful.

SUMMARY OF THE INVENTION

The present invention involves a multiple-screw extruder having a central feed screw meshing with two or more outer screws uniformly spaced around the circumference of the central screw wherein the outer screws have a mean thread diameter equal to a mean thread diameter of the central screw divided by the number of outer screws. The mean thread diameter of the outer screws is defined as their pitch diameter, and that of the central screw is defined as a diameter between its pitch diameter less one-third of the depth of the thread and its pitch diameter plus one-third of the depth of the thread and preferably between its pitch diameter less one third of the depth of thread and its pitch diameter. With this arrangement approximately equal conditions are created for the plastic material conveyed by the central feed screw and that conveyed by the outer screws because the threads of the outer screws, from end to end of the enclosed extruder space, are of approximately the same length as those of the central feed screw. If, for instance, three outer screws are arranged about one central screw and the mean diameter of the outer screws is about one-third of that of the central screw, the points of engagement of the outer screws with the central screw divide the central feed screw's circumference into three equal parts or segments of a length of arc corresponding approximately to the circumference of the outer screws. However, since the threads in the outer screws have a greater curvature, the volume of the grooving of these threads is rather less than that of the central feed screw with its smaller curvature, in the area between the points of engagement of two adjacent outer screws. It is therefore preferable if the mean diameter of the outer screws is taken as their pitch diameter, and that of the central feed screw as one between its pitch diameter less one- third of the depth of the thread and its pitch diameter, so that the volumes of the plastic material enclosed in the groove of one thread of an outer screw and that in the groove of one thread of the central feed screw correspond more closely to each other, in view of the somewhat larger size of the central feed screw.

The diameters of the outer screws can be made approximately equal, as in the case of a twin feed screw extruder, so that the same conveying conditions can be created as with a twin feed screw extruder. If, for instance, five outer screws are arranged round a central feed screw, the rate of feed of a multiple-screw extruder of this kind is five times that of a twin feed screw extruder, where the feed screws are of the same size as the outer screws of the extruder according to the invention. This yields good driving conditions because the large central screw tends to float between the outer screws, and carries substantially no radial load, while the comparatively small outer screws carry radial loads, but not more than in the case of a twin feed screw extruder of only a fraction of the performance.

For many materials it is necessary to arrange the material composition to suit the machine. Since in the case of the multiple feed screw extruder according to the invention, approximately the same conveying conditions are obtained in the threads of the outer screw and in the thread parts of the central screw, as in the case of a twin feed screw extruder with a single pair of feed screws, these feed screws corresponding to the outer feed screws of the multiple model, each new composition can be tried out in a twin feed screw extruder or perhaps in a multiscrew extruder according to the invention with only two outer screws, and then used without change in a multiscrew extruder according to the invention, with a large number of outer screws. In this way the composition can be tested on a small scale so that less material is lost.

The more effectively the conveying conditions in the threads of the outer screws are adapted to those in the thread parts of the central screw, the more accurately the material fed by the outer screws agrees with that fed by the central screw, and the more homogeneous is the material leaving the extruder. in order to ensure even greater agreement between the conveying conditions in the outer screws and in the central screw, the number of threads of the central screw may be made equal to the number of threads of the outer screws multiplied by the number of outer screws, and also, the central screw and the outer screws can be made with approximately the same helix angle. Moreover, according to a further feature of the invention it is convenient to make the depth of thread and width of thread of the central screw equal to those of the outer screws, the threads in the central screw and the outer screws having preferably the same section.

In order to ensure further homogenization of the material leaving the extruder, the invention further proposes extending the central screw on the outlet side of the machine, beyond the length of the outer screws, to form a mixing head, the pitch of the central screw at the part where it projects beyond the outer screws being at least twice the pitch of the central screw at the part of this screw where it cooperates In the outer screws so that the rate of feed of this screw at the mixing head is increased. If the pitch of the feed screw in the mixing head, with about the same diameter as that of the central screw, is twice the pitch of the threads in the central screw, the rate of feed of the mixing head of this screw should correspond to the total combined rates of feed of the central screw and the outer screws, if the mixing head screw is a nonslip one. But since this is not the case and the material in the mixing end slips, it is convenient to make the pitch of the screw threads in the mixing head more than twice that of the screw threads of the central screw.

BRIEF DESCRIPTION OF THE DRAWINGS

The invention will now be described by way of example, with reference to the accompanying drawings, in which:

FIG. 1 is a longitudinal section through an extruder along the line I—I of FIG. 2, FIG. 2 is a cross section along the line II—II of FIG. 1, and FIG. 3 shows an axial section through a screw thread, on a larger scale.

DESCRIPTION OF THE PREFERRED EMBODIMENT

The reference 1 denotes a screw barrel and 2 the extruder outlet aperture. At the end of screw barrel 1 opposite the outlet aperture 2, an admission duct for the material to be extruded is provided in the usual manner. The material is a thermoplastic one, for instance, polyvinyl chloride.

A central feed screw 3 with a relatively large diameter is accommodated in the barrel and feed screws 4 of smaller diameter, denoted here by the term "outer screws," mesh with it. The outer screws 4 are uniformly spaced around the circumference of the central screw 3. In the embodiment shown there are three outer screws 4, so that they are spaced at 120°. If, for instance, five outer screws are provided, the spacing would be 72°. The screws extend longitudinally in the barrel. The mean diameter of the outer screws 4 corresponds to the mean diameter of the central screw 3 divided by the number N of outer screws provided. In the embodiment shown with three outer screws 4, the mean diameter of these outer screws is accordingly one-third of the diameter of the central screw 3. The number of threads of the central screw 3 is equal to the number of threads of the outer screws 4, multiplied by the number N of outer screws. Since the threads of the outer screws 4 are single-start ones, in the present case, the central screw 3 would have three starts (three threads). The central screw 3 and the outer screws 4 are positively driven at fixed relative speeds so that the outer screws 4 rotate at three times the speed of the central screw 3. The helix angle of the central screw 3 is approximately equal to that of the outer screws 4.

The circumference of central screw 3 is about three times that of each outer screw 4. The starts or individual threads of the central screw are therefore divided by the outer screws 4 into parts or segments $a$, each being as long as the free threads of the outer screws 4, indicated by the symbol $b$. The threads end each in points 5 and 6, so that the lengths $a$ and $b$ are measured each from the point 6 to the point 5. This means that the points of engagement at the points 5 and 6 separate approximately equal volumes of the grooving defined by the threads in the central feed screw 3 and in the outer screws 4, so that approximately equal conveying conditions are created.

In FIG. 3, a thread 7 of a screw is shown in section, on a larger scale, and the grooving defined by the thread is indicated at 7a. This illustration is applicable both to the outer screws and to the central screw. Reference 9 is the cylindrical wall of the barrel 1 surrounding the worm thread 7. The core diameter of the screw is indicated by $c$, the pitch diameter by $d$, and the outside diameter by $e$. The feeding rate of the screw depends largely on the ratio of the moving parts of the circumference of the screw thread 7 to its nonmoving parts. The base 8 of the grooving defined by the screw thread and the flanks 11 are moving so as to convey the medium. The cylindrical wall 9 of the barrel is stationary and acts as a brake. The ratio of the moving surface 8 and 11 to the stationary surface 9 is governed by the diameter of the screw and this diameter is in the case of the central screw 3 with its large diameter greater than in the outer screws 4 of similar diameter. The mean diameters to be used of the central screw and the outer screws, taken in the embodiment shown in the drawing in the ratio 3/1, are accordingly not accurately known. Approximately the right result is obtained if in the case of the outer screws the mean diameter is taken as the pitch diameter $d$, and in the case of the central screw a diameter is selected from the range limited by the pitch diameter $d$ less one-third of the depth of thread $f$, on the one hand, and the pitch diameter $d$ plus a third of the depth of thread $f$, on the other. In this range, amounting to two-thirds of the depth of thread $f$, favorable conditions are found. However, it is convenient to take, as the mean diameter to be used in a ratio of 1/3, the pitch diameter $d$, for the outer screws, and for the central screw a diameter lying between the pitch diameter $d$ less one-third of the depth of thread $f$, and the pitch diameter $d$. This means that the length of the thread, measured on the pitch diameter of the central screw 3, is slightly shorter than in the outer screws 4. This takes into account the fact, already mentioned above, that in the central screw 3 with its larger diameter the ratio of the radially moving surfaces 8 and 11 to the stationary surface 9 is greater than in the outer screw 4 with its smaller core diameter so that in the central screw friction and adhesion of the material bring about comparatively more effective feed in the radial direction, and that the feed of the outer screw is less than that of the larger central screw 3 because of the greater curvature of the pitch circle of the smaller side screws, so that the volume of a thread of an outer screw is less than that of a central screw, for a pitch arc of the same length.

The more the screws are arranged to suit each other, the more the conveying conditions in the grooving 7a of the threads 7 of the central screw 3 are assimilated to those of the grooving of the threads 7 of the outer screws 4. In order to achieve further homogenization of the extruded material, the central screw 3 is extended beyond the outer screws 4 to form a mixing head 12. This mixing head 12 rotates in a cylindrical extension 13 of the screw barrel 1 and has screw threads 14 of a lead more than twice that of the screw threads 7.

The drive of the central screw is effected in the usual manner by a gearwheel 15 on a shaft 16 of the central screw 3. This shaft 16 also has a pinion 17 engaging with pinions 18 on shafts 19 of the outer screws 4. In this way the outer screws 4 are driven at the correct ratio of the central screw 3. The thrust of the central screw is absorbed by a thrust bearing 20 and the thrusts of the outer screws 4 by thrust bearings 21.

What I claim is:

1. A multiple-screw extruder comprising a barrel having an outlet at one end for extrusion therethrough of material admitted to the barrel, a central feed screw extending longitudinally in the barrel, a number N of outer feed screws extending longitudinally in the barrel spaced at substantially equal intervals around the central screw and each in mesh with the central screw, said screws being adapted upon rotation thereof in the barrel to feed material forward in the grooving defined by the threads of the screws toward and out through said outlet, and means for driving the screws for feeding material forward in said grooving, each of the outer screws having a mean thread diameter equal to a mean thread diameter of the central screw divided by N, the mean thread diameter of each outer screw being taken as its pitch diameter, and the mean thread diameter of the central screw being a diameter in the range between the pitch diameter of the central screw less 1/N times its thread depth and the pitch diameter of the central screw plus 1/N times its thread depth.

2. A multiple-screw extruder according to claim 1 in which the number of threads of the central screw is equal to the number of threads of the outer screws multiplied by the number N of outer screws.

3. A multiple-screw extruder according to claim 2, in which the central screw and the outer screws have approximately the same helix angle.

4. A multiple-screw extruder according to claim 3 in which the depth of thread and width of thread of the central screw are equal to those of the outer screws.

5. A multiple-screw extruder according to claim 4 in which the threads of the central screw and those of the outer screws have the same cross section.

6. A multiple-screw extruder according to claim 5 in which the central screw is extended at the outlet end beyond the outer screws, to form a mixing head, having a helix angle at least twice that of the central screw where it cooperates with the outer screws.

7. A multiple-screw extruder comprising a barrel having an outlet at one end for extrusion therethrough of material admitted to the barrel, a central feed screw extending longitudinally in the barrel, a plurality of outer feed screws extending longitudinally in the barrel spaced at substantially equal intervals around the central screw and each in mesh with the central screw, said screws being adapted upon rotation thereof in the barrel to feed material forward in the grooving defined by the threads of the screws toward and out through said outlet, and means for positively driving all the screws for feeding material forward in said grooving, the threads of the central and outer screws being so related and the driving means being adapted to drive the outer screws at such speed relative to the central screw that the outer screws feed the material forward at substantially the same rate as the central screw, wherein the central screw has a plurality of threads equal in number to the number of threads on each outer screw multiplied by the number of outer screws, wherein the volume of the grooving of each outer screw over the length thereof is substantially equal to the volume of the grooving of the central screw in a segment of the central screw between two adjacent outer screws over the same length, wherein the length of each thread of the outer screws is approximately equal to the length of each thread of the central screw and wherein the threads of all the screws are of substantially the same cross section, wherein the helix angles of the central screw and each outer screw are approximately equal, wherein the number of outer screws equals N and wherein each outer screw has a mean thread diameter substantially equal to 1/N times the means thread diameter of the central screw, the mean thread diameter of each outer screw being taken as its pitch diameter, and the mean thread diameter of the central screw being a diameter in the range between the pitch diameter of the central screw less 1/N times its thread depth and the pitch diameter of the central screw plus 1/N times its thread depth.

8. A multiple-screw extruder as set forth in claim 7 wherein there are three outer screws and wherein each outer screw has a mean thread diameter substantially equal to one-third the mean thread diameter of the central screw, the mean thread diameter of each outer screw being taken as its pitch diameter, and the mean thread diameter of the central screw being a diameter in the range between the pitch diameter of the central screw less one-third of its thread depth and the pitch diameter of the central screw plus one-third its thread depth.

9. A multiple-screw extruder as set forth in claim 7 wherein the number of outer screws equals N and wherein each outer screw has a mean thread diameter substantially equal to 1/N times the mean thread diameter of the central screw, the mean thread diameter of each outer screw being taken as its pitch diameter, and the mean thread diameter of the central screw being a diameter in the range between the pitch diameter of the central screw less 1/N times its thread depth and the pitch diameter of the central screw.

10. A multiple-screw extruder as set forth in claim 7 wherein there are three outer screws and wherein each outer screw has a mean thread diameter substantially equal to one-third the mean thread diameter of the central screw, the mean thread diameter of each outer screw being taken as its pitch diameter, and the mean thread diameter of the central screw being a diameter in the range between the pitch diameter of the central screw less one-third of its thread depth and the pitch diameter of the central screw.

* * * * *